Nov. 20, 1956  S. DU PONT  2,770,967
DEVICE FOR MEARSURING THE AERODYNAMIC PITCHING MOMENTS
OF A SHORT LENGTH OF A FULL SIZED AIRFOIL
Filed Nov. 16, 1953
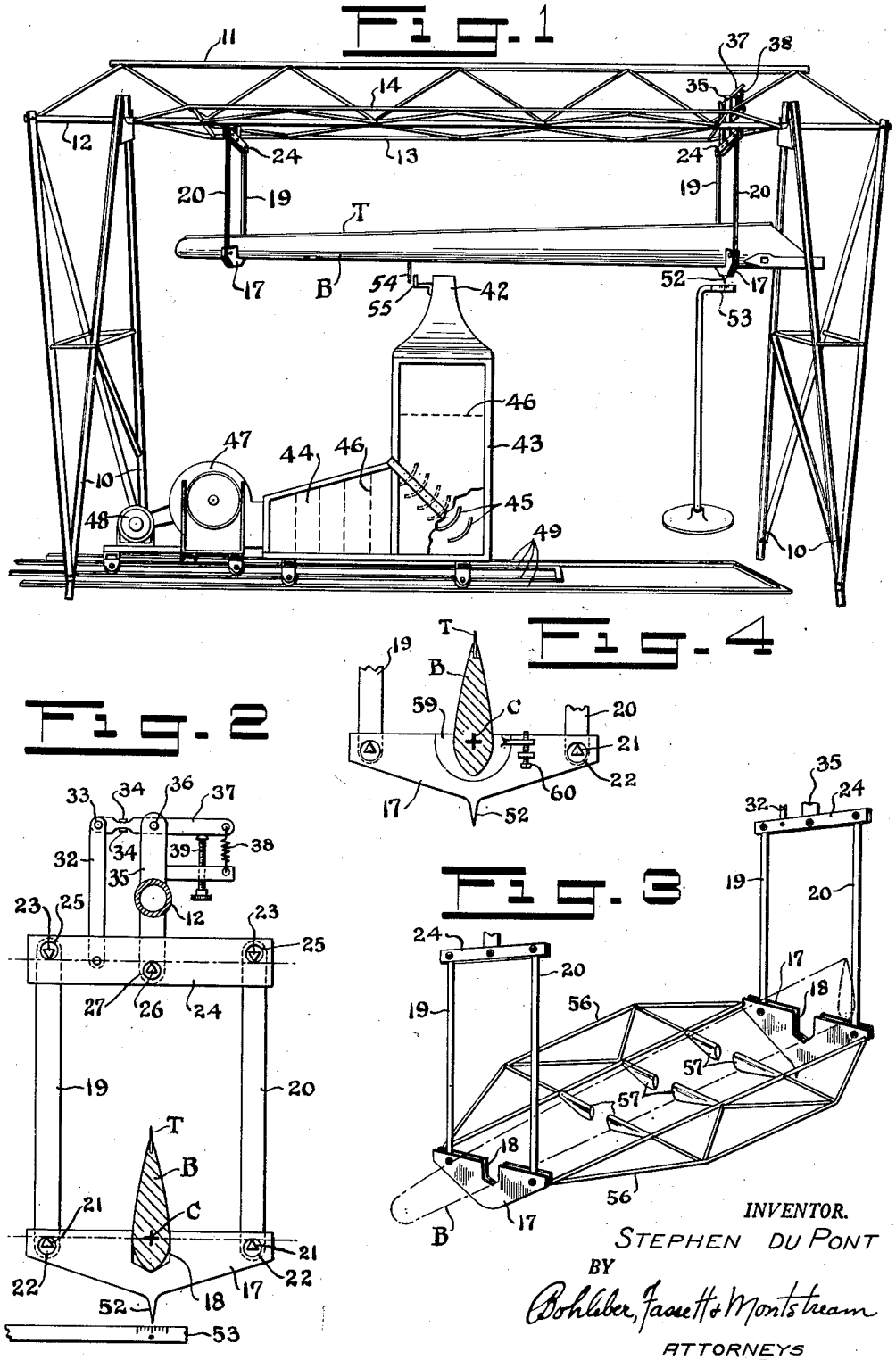
INVENTOR.
STEPHEN DU PONT
BY
Bohleber, Fassett & Montstream
ATTORNEYS

United States Patent Office 2,770,967
Patented Nov. 20, 1956

2,770,967

DEVICE FOR MEASURING THE AERODYNAMIC PITCHING MOMENTS OF A SHORT LENGTH OF A FULL SIZED AIRFOIL

Stephen du Pont, Westport, Conn., assignor to Doman Helicopters, Inc., Danbury, Conn., a corporation of Delaware Application November 16, 1953, Serial No. 392,330

14 Claims. (Cl. 73—147)

The invention relates to a device for measuring the aerodynamic pitching moment of a short length or span of a full size aerodynamic structure such as a blade for a rotor of a self sustaining aircraft whereby the short length and the full length of the blade may be aerodynamically trimmed. The customary manner of trimming a set of blades for a rotor is to mount the blades on a whirling stand and turn the head at its normal rotor speed. The blades are observed for tracking as they are whirled, the observation usually being by chalk mark of a different color for each blade being made on a cloth to indicate which blades are not tracking in the same path after which the rotor is stopped, the blade trim tab adjusted where and in an amount deemed necessary after which the whirling stand with its blades is again turned at normal speed and a second test made. This may continue many times before a set of blades is satisfactorily trimmed and are tracking each other. Thereafter the blades are mounted on a rotor head and rotated and again tested for tracking. With this method described a new or replaced blade must be completely trimmed with the old blades or a complete set of trimmed blades substituted.

With the device to be described, blades may be trimmed without whirling the same on a whirling stand nor on a rotor head and is accomplished with great ease and with accuracy. Furthermore a new or replacement blade of the same trim characteristic can be inserted in a rotor head with a set of blades having known trim characteristics as previously tested with the assurance that it will track or can be made to track with but little additional trimming with the old blades carried by the rotor.

It is an object of the invention to provide an improved device for trimming an aerodynamic structure and particularly trimming blades such as for main and tail rotors of self sustaining aircraft and the like.

Another object is to provide a device for trimming blades such as for main and tail rotors of self sustaining aircraft and the like which mounts the blade horizontally and uses a horizontally movable jet mechanism.

Other objects of the invention will be more apparent from the following description when taken in connection with the accompanying drawings illustrating a preferred embodiment in which:

Figure 1 is a side view in perspective of the blade trimming device;

Figure 2 is an enlarged view of a blade supporting cradle and means for measuring the aerodynamic moment of a blade;

Figure 3 is a perspective view of a straightening frame for use with bent blade; and Figure 4 is a partial view of another construction for adjusting the position of the blade.

The device is used to measure the aerodynamic moment of short lengths of a full sized aerodynamic structure and particularly of a blade for a rotor head, tail rotors, blades for convertaplanes and the like. The device supports the blade horizontally and preferably with its aerodynamic chord vertically. A jet mechanism, which is portable or movable horizontally so that it may be moved along the length of the leading edge of the blade, subjects short lengths of the blade to the jet or air stream so that the aerodynamic pitching moment of each short length of the blade is determined and can be easily trimmed to a desired value. The blade B has a bendable tab T carried by the trailing edge thereof to trim or alter the aerodynamic pitching moment of the blade so that it may be trimmed to a zero moment or to some predetermined desired value. If the pitching moment is not zero or of the desired value the jet is shut down, obstructed, by-passed or moved away therefrom, the trim tab is bent and again tested, which steps are easily followed until this short length of blade has the desired pitching moment. These steps continue throughout the entire length of a blade until it has been trimmed throughout its length. A series or set of blades having the same aerodynamic moment will track when mounted on a rotor head or will track reasonably close.

The device includes a frame of suitable rigidity and may be constructed in any fashion desired. The frame particularly illustrated includes upright structure or spaced legs 10 which support a vertical truss 11, the lower member 12 of which is given lateral rigidity also by trusses 13 and 14 on each side thereof. The frame may be the roof, roof beams or upper floor structure of a building if it is of the proper height and far enough away so as not to interfere with the securing of a proper air stream from the jet mechanism.

The blade is carried by supporting means which allows lateral movement of the supporting means and blade under a lift force created by the air stream of the jet and also to pivot about its mean aerodynamic chord or center under an aerodynamic pitching moment created by the jet. The means illustrated is at least two supporting cradles suspended from the frame or the lower bar 12 of the truss 10. Each cradle is a floating parallelogram construction and includes a cradle arm 17 having suitable means for supporting or holding the blade preferably with its chord vertically, the means particularly shown being a slot or recess 18 in the arm at its center. The cradle arm is carried by a pair of spaced cradle links 19 and 20, which with a vertical cradle are uprights, support the cradle arm at one end thereof with frictionless bearings or connections shown as knife edges or fulcrums 21 received in holes 22 in the cradle arm. The bearing axis or fulcrum points are in line with the aerodynamic center or axis of feathering freedom C of the blade, in order to avoid a drag moment. This chord or axis for a symmetrical airfoil is approximately 24% of the chord from the leading edge. The other or upper end of each cradle link is connected by frictionless bearing means with a balance beam or cross arm 24 also shown as knife edges or fulcrums 23 and bearing holes 25. The cross arm in turn is supported at its mid point by a frictionless bearing such as a knife edge or fulcrum 26 which is received in a bearing hole 27 in the arm, the fulcrum 26 being carried by a bar 28 secured to the lower bar 12 of the truss 11. The bearing axis, centers or fulcrum point 23 are in line with the bearing axis or fulcrum point 26. The cradle is a floating or pendular parallelogram construction so that the blade may shift laterally pendularly without altering the vertical position of the blade chord. Two such cradles are shown although additional ones may be provided if deemed desirable.

Means are provided to measure the aerodynamic pitching moment of that portion of the blade which is in the air stream of the jet which means may take many forms. The preferred form particularly shown includes a link 32 connected with the cross arm or balance beam 24 at a point spaced from the fulcrum 26 and a flexible lever 33 connected with the link. Any bending of the flexible lever caused by an aerodynamic pitching moment on the blade is measured such as by one or more strain gages 34, two of which are particularly illustrated one being on each side of the flexible lever. The flexible lever 33 is in reality fixed such as to a bar 35 carried by the lower bar 12 of the truss; however, it is mounted on a pivot 36 for adjustment as will appear more fully hereinafter. It is clear that the means to measure the aerodynamic moment of the blade or the flexible end of the lever 33 may be clamped to the blade at any convenient point so that any pivoting of the blade on its aerodynamic center when the jet is directed on the blade may be measured.

Means are provided to angularly adjust the position of the blade which may be accomplished in several ways, the simpler construction being to angularly adjust the cradle arm 17 and to adjust this arm through the torque measuring means. The means illustrated in Figure 2 is connected with the flexible lever 33 and includes an adjusting screw 39 which engages an extension 37 of the flexible lever and a spring 38 is connected with the extension to hold the lever against the end of the adjusting screw. The spring is strong enough to hold the lever thereagainst over any pitching moments or torque applied through the link 32. Such torques are small, however. If the chord of the blade is not vertical it will have a lift force when the air stream is directed thereon which will move the blade and supporting means laterally which will be indicated by the pointer 52 moving on the scale 53. When this occurs the screw 39 is adjusted to pivot the flexible lever 33, and the cross arm 24 which in turn pivots or changes the angular position of the cradle arm 17 and blade, which through the blade adjusts the other cradle arm to the same angular position so that the blade shows zero lift. This is indicated by the pointer 52 returning to its position on the scale 53 when no jet is applied to the blade. Preferably a pointer or wire 54 is secured to the blade such as by modeling clay or a clamp and the scale 55 is carried by the nozzle or jet mechanism.

A portable jet mechanism providing a jet of small dimension relatively to the blade length is movable in alignment with the slots or recesses 18 in the cradle arms so that the jet moves lengthwise of a blade mounted therein and is directed against the leading edge of the blade. The jet mechanism particularly illustrated has a nozzle 42 for emitting an air stream or jet which nozzle is connected with a diffusion chamber or tunnel. In order to shorten the vertical length of the diffusion chamber it is of angular or elbow form with a vertical settling portion 43 and a horizontal diffusion portion 44. The diffusion chamber may have turning vanes 45 at the corner and diffusion screens 46 therein in order to reduce turbulence and provide relatively smooth or straight flow for the jet or air stream emitted from the nozzle. The jet mechanism includes a fan 47 connected with the end of the diffusion chamber which fan may be driven by a motor 48. The entire jet mechanism is mounted upon rails 49 so that it may be movable horizontally of the full length of the blade with the air stream directed against the leading edge.

The width of the nozzle is very narrow or has a small dimension compared to the length of the blade and its width is dependent principally upon the extent of blade length to be trimmed at a time, the volume of air to be presented thereto, and the velocity of the jet. A nozzle length of about eighteen inches and a width of six inches is satisfactory. The width of the nozzle is presented lengthwise of the blade so that with a twenty-five foot blade and a six inch wide nozzle, the latter is but one-fiftieth of the blade length. The speed or velocity of the jet or air stream may be selected over a range technically from 0 to the sonic barrier velocity; however, as a practical matter the velocity must be high enough to overcome friction of the cradle bearings and to give a reading or measurement commensurate with the sensitivity of the balance or pitching moment measuring device. As a practical matter also it probably would not be advantageous to have a jet velocity higher than the maximum air velocity encountered by the blade when rotating in flight on a rotor. More accurate results are secured with a higher velocity of jet and a velocity of about one hundred miles an hour will give accurate results and requires about a ten horsepower motor to drive the fan for a jet having dimensions of six by eighteen inches mentioned above. Probably a maximum width of nozzle or air stream would be about eighteen inches which would be limited by the size of the fan and motor necessary to provide sufficient air at the desired velocity of the jet or wind stream. It is obvious that increasing the nozzle size will require a larger fan and motor; and increasing the velocity will require a larger fan and motor. Decreasing the size of nozzle or velocity of the jet or both permits use of a smaller fan and motor.

Figure 4 illustrates a form of construction by which the angular position of the blade may be adjusted to zero lift, which adjustment is not through the torque measuring means. The cradle arm 17 carries sector 59, the circular periphery of which is centered on the mean aerodynamic chord C and the angular position of the sector is adjusted such as by an adjusting screw 60.

In measuring the aerodynamic pitching moment and trimming a blade, the position of the indicator pointer 52 is noted, the jet is then presented to the blade and any change in the position of the pointer indicator is observed. If the blade does have some lift it appears by the lateral shifting or movement of the blade and cradle arm against the weight of the blade or gravity tending to restore the blade to pendular zero position. If the blade shows lift the screw 39 is adjusted to tilt the cradle arm and blade until the pointer 52 returns to its initial position or marking on the scale 53. With the pointer 52 at initial reading, any aerodynamic pitching moment will pivot the blade and the cradle arm about the aerodynamic chord or center C which pivoting torque or moment is transmitted through the cradle links 19, 20, cross arm 24 and link 32 to the bendable lever 33 and bend the same. The extent or amount of the bend of the lever will be a measure of the aerodynamic moment on the blade and the strain gages will measure the value of this torque or moment. If the moment is not zero or the desired value, the bendable tab T of the blade is bent until the moment is of the desired value. When one short length of blade measured by the width of the air stream has been trimmed as desired, the jet is moved to the next section or portion of the blade and the same process is repeated throughout the length of the blade until it shows the desired aerodynamic moment throughout its length.

Sometimes a blade is not straight. This may exist in a new blade but it is very likely that it will appear in a used blade. In order to give a correct reading the blade should be straight. If it is straight between the recess in the cradle arms it will in all likelihood be straight at its ends. To accomplish this, bracing means is provided as shown in Figure 3 which may comprise a truss 56 carried on each side of the cradle arms 17. Each truss carries inwardly directed braces 57 which engage the surfaces of the blade and hold it in a straight alignment with the slots 18 in the cradle arms. The braces 57 are narrow or streamlined or balanced by braces on opposite sides of the blade so that they do not create their own torque on the supporting means.

A device which supports the blade with its chord vertically and its leading edge downwardly, provides a simpler construction in that no provision need be made for blade bending between cradles since any bending of the blade by its own weight would be in the plane of its chordal axis and not to introduce a misalignment moment arm, secondly gravity or the blade weight is used to show when the blade does not have zero lift, and thirdly, the weight of the blade retains or aids in retaining the same in the cradle against the pressure of the air stream against the leading edge.

Since the blades of a self sustaining aircraft rotate from a center, the air speed of portions or sections of a blade increases radially outwardly towards the blade tip. The jet of the jet mechanism is preferably maintained at a constant velocity. The pitching moment is proportional to the square of the velocity so that the moment for other velocities can be calculated by using a correction factor which may be set up in a table, chart or graph. In the event that it is desired that the blade have a predetermined moment either throughout its length or a moment which is different in different sections of the blade, the moment at different velocities may be calculated using the correction factor.

This invention is presented to fill a need for improvements in a Device for Measuring the Aerodynamic Pitching Moments of a Short Length of a Full Sized Airfoil. It is understood that various modifications in structure, as well as changes in mode of operation, assembly, and manner of use, may and often do occur to those skilled in the art, especially after benefiting from the teachings of an invention. Hence it will be understood that this disclosure is illustrative of preferred means of embodying the invention in useful form by explaining the construction, operation and advantages thereof.

What is claimed is:

1. A device, for measuring the aerodynamic pitching moment of an airfoil section of a full sized airfoil having an aerodynamic center, comprising a frame, supporting mechanism for the airfoil section carried by the frame including at least two spaced support cradles to support the full sized and full length airfoil horizontally and having freedom of movement laterally with respect to the airfoil and angularly about the approximate aerodynamic center of the airfoil section, means to adjust the angular position of one of the supporting means about the aerodynamic center of the airfoil, means to measure the turning moment of the airfoil section in its supporting means, a jet mechanism having a nozzle of narrow width with respect to the airfoil length directed towards the leading edge of the airfoil, and means mounting one mechanism relatively to the other for movement to present the length of the airfoil to the jet from the nozzle.

2. A device, for measuring the aerodynamic pitching moment of a short length of a full sized aerodynamic surface or blade as an aid in trimming blades having an aerodynamic center such as for a self sustaining rotor and the like, comprising a frame, at least two spaced blade supporting means carried by the frame to support a blade horizontally and having movement laterally and angularly about the aerodynamic center of the blade, means to adjust the angular position of at least one of the supporting means about the aerodynamic center of the blade, means connected with the supporting means to measure the turning moment of the latter, a jet mechanism having a nozzle of narrow width and directed towards the leading edge of the blade, and means mounting the jet mechanism for movement of the nozzle in front of the leading edge of the length of the blade.

3. A device for measuring the aerodynamic moment of a short length of a full sized aerodynamic surface or blade as in claim 2 including a blade bracing frame carried by the supporting means and on each side thereof and engaging the sides of the blade to retain the same straight on the supporting means.

4. A device for measuring the aerodynamic moment of a short length of a full sized aerodynamic surface or blade as in claim 2 in which the jet mechanism includes a diffusing chamber having a vertical portion and horizontal portion approximately at right angles thereto.

5. A device, for measuring the aerodynamic pitching moment of a short length of a full sized aerodynamic surface or blade as an aid in trimming blades having an aerodynamic center such as for a self sustaining rotor and the like, comprising a frame, at least two spaced blade supporting means to support a blade horizontally and having movement laterally and angularly about the aerodynamic center of the blade, means to indicate lateral movement of the supporting means, means to adjust the angular position of at least one of the supporting means about the aerodynamic center of the blade, means connected with the supporting means to measure the turning moment of the latter, a jet mechanism having a nozzle of narrow width and directed towards the leading edge of the blade, and means mounting the jet mechanism for movement along the leading edge of the length of the blade.

6. A device, for measuring the aerodynamic pitching moment of a short length of a full sized aerodynamic surface or blade as an aid in trimming blades having an aerodynamic center such as for a self sustaining rotor and the like, comprising a frame, at least two spaced blade supporting means to support a blade horizontally and with its aerodynamic chord vertical and having movement laterally and angularly about the mean aerodynamic chord of the blade, means to adjust the angular position of at least one of the supporting means about the aerodynamic center of the blade, means connected with the supporting means to measure the turning moment of the latter, a jet mechanism having a nozzle of narrow width and directed vertically towards the leading edge of the blade, and means mounting the jet mechanism for movement underneath the leading edge of the length of the blade.

7. A device for measuring the aerodynamic pitching moment of a short length of a full sized aerodynamic surface or blade as an aid in trimming blades having an aerodynamic center such as for a self sustaining rotor and the like, comprising a frame, at least two spaced blade supporting means to support a blade horizontally and with its chord vertical and having movement laterally and adjustable angularly about the aerodynamic center of the blade, means to indicate lateral movement of the supporting means, means to adjust the angular position of at least one of the supporting means about the aerodynamic center of the blade, means connected with the supporting means to measure the turning moment of the latter, a jet mechanism having a nozzle of narrow width and directed vertically towards the leading edge of a blade, and means mounting the jet mechanism for movement underneath and along the leading edge of the length of the blade.

8. A device, for measuring the aerodynamic pitching moment of a short length of an aerodynamic surface or blade as an aid in trimming blades having an aerodynamic center such as for a self sustaining rotor and the like, comprising a frame, at least two spaced blade supporting parallelogram cradles carried by the frame to support a full length blade horizontally and having low friction bearings; each cradle including a cradle arm having means to support a blade with the aerodynamic center of the blade in line with the axis of the bearings of the cradle arm; means to adjust the angular position of the blade supporting means of one of the cradle arms about the aerodynamic center of the blade, means connected with the cradle arm to indicate the pitching moment thereon, a jet mechanism having a narrow width nozzle directed towards the leading edge of a blade, and means movably mounting the jet mechanism for movement in line with the blade supporting means of the cradle arms and lengthwise of a blade with the width of the nozzle presented to the leading edge and lengthwise of the blade.

9. A device for measuring the aerodynamic pitching moment of a short length of an aerodynamic surface as in claim 8 including blade bracing means carried by the cradle arms on each side thereof to engage the sides of a blade.

10. A device, for measuring the aerodynamic pitching moment of a short length of an aerodynamic surface or blade as an aid in trimming blades having an aerodynamic center such as for a self sustaining rotor and the like, comprising a frame; at least two spaced blade supporting cradles carried by the frame to support a full length blade horizontally, each cradle including a cradle arm having means to support a blade thereon, a pair of spaced cradle links connected with the cradle arm and carrying the same upon frictionless bearings at one end thereof in line with the aerodynamic center of the blade, a cross arm connected with the other end of the pair of cradle links with frictionless bearings, and a frictionless bearing carried by the frame and mounting the cross arm centrally between the cradle link bearings and in line with the axis thereof; means to adjust the angular position of the blade supporting means carried by one of the cradle arms about the aerodynamic center of the blade, a flexible strain arm connected with one of the cross arms, means to indicate the bending of the flexible strain arm, a jet mechanism having a nozzle directed towards the leading edge of a blade, and means movably mounting the jet mechanism lengthwise of the blade with the width of the nozzle presented to the leading edge and lengthwise of the blade.

11. A device for measuring the aerodynamic pitching moment of a short length of an aerodynamic surface as in claim 10 including blade bracing means carried by the cradles on each side thereof to engage the sides of a blade.

12. A device, for measuring the aerodynamic pitching moment of a short length of an aerodynamic surface or blade as an aid in trimming blades having an aerodynamic center such as for a self sustaining rotor and the like, comprising a frame; at least two spaced blade supporting cradles carried by the frame to support a full length blade horizontally, each cradle including a cradle arm having means to support a blade thereon, a pair of spaced cradle links connected with the cradle arm and carrying the same upon frictionless bearings at one end, the bearings being in line with the aerodynamic center of the blade, a cross arm connected with the other end of the pair of cradle links with frictionless bearings, and a frictionless bearing carried by the frame and mounting the cross arm centrally between the cradle link bearings and in line with the axis thereof; means to adjust the angular position of one of the cross arms about the aerodynamic center of the blade, a flexible lever connected with one of the cross arms, means to indicate the bending of the flexible lever, a jet mechanism having a narrow width nozzle directed in a direction of the leading edge of a blade, and means mounting the jet mechanism for movement in line with the blade supporting means of the cradle arms and lengthwise of a blade with the width of the nozzle presented to the leading edge and lengthwise of the blade.

13. A device, for measuring the aerodynamic pitching moment of a short length of an aerodynamic surface or blade as an aid in trimming blades having an aerodynamic center such as for a self sustaining rotor and the like, comprising a frame, at least two spaced blade supporting cradles carried by the frame to support a full length blade horizontally and chordally vertical, each cradle including a cradle arm having means to support a blade thereon, a pair of spaced cradle links for connection with the cradle arm and carrying the same upon frictionless bearings at one end thereof in line with the aerodynamic center of the blade, a cross arm connected with the other end of the pair of cradle links with frictionless bearings, and a frictionless bearing carried by the frame and mounting the cross arm centrally between the cradle link bearings and in line with the axis thereof; means to adjust the angular position of the blade supporting means carried by one of the cradle arms about the aerodynamic center of the blade, a flexible strain arm connected with one of the cross arms, means to indicate the bending of the flexible strain arm, a jet mechanism having a nozzle directed vertically upwards toward the leading edge of the blade and means movably mounting the jet mechanism lengthwise of the blade with the width of the nozzle presented to the leading edge and lengthwise of the blade.

14. A device, for measuring the aerodynamic pitching moment of a short length of an aerodynamic surface or blade as an aid in trimming blades having an aerodynamic center such as for a self sustaining rotor and the like, comprising a frame, at least two spaced blade supporting cradles carried by the frame to support a full length blade horizontally; each cradle including a cradle arm having means to support a blade thereon, a pair of spaced cradle links for the cradle arm and carrying the same upon frictionless bearings at one end thereof in line with the aerodynamic center of the blade, a cross arm connected with the other end of each pair of cradle links with frictionless bearings, and a frictionless bearing carried by the frame and mounting the cross arm centrally between the cradle link bearings and in line therewith, a flexible lever connected with one of the cross arms, means to adjust the angular position of the flexible lever and hence of one of the cradle arms about the aerodynamic center of the blade, means to indicate the bending of the flexible lever, a jet mechanism having a narrow width nozzle directed in a direction of the leading edge of a blade, and means mounting the jet mechanism for movement in line with the blade supporting means of the cradle arms and lengthwise of the blade with the width of the nozzle presented to the leading edge and lengthwise of the blade.

References Cited in the file of this patent

UNITED STATES PATENTS

| | | |
|---|---|---|
| 1,980,195 | Gerhardt et al. | Nov. 13, 1934 |
| 2,331,304 | Carmody | Oct. 12, 1943 |
| 2,448,528 | Heuver | Sept. 7, 1948 |
| 2,716,889 | Doman | Sept. 6, 1955 |

FOREIGN PATENTS

| | | |
|---|---|---|
| 991,146 | France | June 20, 1951 |